United States Patent
Kitagawa et al.

[11] 3,922,071
[45] Nov. 25, 1975

[54] SYMMETRICAL OBJECTIVE

[75] Inventors: Masamichi Kitagawa, Hino; Minoru Yokota, Isehara, both of Japan

[73] Assignee: Konishiroku Photo Industry Co., Ltd., Tokyo, Japan

[22] Filed: Aug. 22, 1973

[21] Appl. No.: 390,510

[30] Foreign Application Priority Data
Aug. 29, 1972 Japan.............................. 47-85876
Aug. 29, 1972 Japan.............................. 47-85877

[52] U.S. Cl.................................. 350/215; 350/220
[51] Int. Cl.²........................ G02B 9/34; G02B 9/62
[58] Field of Search............................ 350/215, 220

[56] References Cited
UNITED STATES PATENTS
| | | | |
|---|---|---|---|
| 2,730,015 | 1/1956 | Tronnier | 350/220 X |
| 3,088,371 | 5/1963 | Lowenthal | 350/215 X |

FOREIGN PATENTS OR APPLICATIONS
| | | | |
|---|---|---|---|
| 57,451 | 8/1967 | Germany | 350/215 |
| 322,506 | 7/1920 | Germany | 350/220 |

Primary Examiner—Paul A. Sacher
Attorney, Agent, or Firm—Bierman & Bierman

[57] ABSTRACT

An improved symmetric objective of small size is disclosed, which comprises front and back lens groups symmetrically arranged on opposite sides of a stop. The front lens group consists of a first lens group and a second cemented positive lens group, the first lens group having a convex surface directed toward an objective with meniscus form, the second lens group having a convex surface directed toward the object rearwardly spaced from the first lens group. The back lens group consists of a third lens group and a fourth lens group, the third lens group being located between the stop and the fourth lens group, the back lens group having a symmetrical arrangement and configurations with the front lens group with respect to the stop. The objective further satisfies the following conditions I, II, III, and IV:

$$0.65l > \left|\frac{r_1}{r_{10}}\right| > 0.35l \qquad \text{I}$$

$$0.06f > d_5 > 0.01f \qquad \text{II}$$

$$\frac{d_1}{d_9} > 0.04f \qquad \text{III}$$

$$0.08f > \frac{d_3 + d_4}{d_6 + d_7} > 0.02f \qquad \text{IV}$$

wherein
$f$ ... a composite focal length of the whole lens system
$l$ ... an axial length of the whole lens system
$r_1$ ... the radius of the curvature of the object side surface of the first lens group
$r_{10}$ ... the radius of the curvature of the image field side surface of the fourth lens group
$d_1$ ... the sum of the glass thickness of the first lens group.
$d_3 + d_4$ ... the axial glass thickness of the second lens group.
$d_5$ ... the air gap between the image field side surface of the second lens group and the object side surface of the third lens group.
$d_6 + d_7$ ... the axial glass thickness of the third lens group.
$d_9$ ... the sum of the glass thickness of the fourth lens group.

3 Claims, 12 Drawing Figures

Spherical aberration

Astigmatism

Spherical aberration

Astigmatism

Meridional coma aberration

SYMMETRICAL OBJECTIVE

The present invention relates a symmetrical objective mainly used for the purpose of copying.

The lens for the purpose of copying is usually desired to have sufficient focusing performance at unity magnification and in the neighborhood thereof and also provide as wide angle of field as possible. On the other hand, from the standpoint of the commercial value the objective is desired to be small in size.

The symmetrical lens systems are proved to cause remarkable distortion when they are used at magnifications other than unity magnification. Also, in their use with wide angle of field, the curvature of field is likely to be increased. Further, in order to satisfactorily compensate for the curvature of field the size of the whole lens system is inevitably increased. Therefore, this type of objective cannot meet the afore-mentioned requirement.

The prior-art symmetrical objectives capable of providing wide angle of field fall within two types as shown in FIGS. 1a and 1b. In their use for the purpose of copying, these objectives have drawbacks to be discussed hereinafter.

With the lens of the type of FIG. 1a the balance of the curvature of field and the coma flare at unity magnification and in the neighborhood thereof is excellent, so that it is suited for use with wide angle of field.

However, it has a drawback that distortion varies remarkably with change of the magnification.

In addition, since it has negative lenses arranged directly on opposite sides of the stop, the length of the lens system is likely to be comparatively large (about $0.5 f$ to $0.6 f$ where $f$ is the composite focal distance of the whole system).

In the lens system of the type of FIG. 1b, the arrangement of the negative and positive lenses is opposite to that in the type of FIG. 1a. Thus, the length of the lens system is small compared to the type of FIG. 1a, and also the variation is comparatively small.

However, with wide angle of field the curvature of field is extremely increased. Besides, an intention to compensate for the curvature of image field would lead to increased variations of the distortion. In this case, the length of the lens system would also be increased as the type of FIG. 1a.

In order to sufficiently overcome the drawbacks inherent in these two types of the lens systems the third type as shown in FIG. 1c may be contemplated. In this type, however, the length of the whole lens system is extremely increased (to $0.8 f$ to $0.9 f$), so that the aforementioned desire cannot be met.

Accordingly, an object of this invention is to provide a lens system free from the above drawbacks in prior art. Another object of this invention is to provide a lens system having small variation of distortion with change in magnification.

Still another object of this invention is to provide a lens system having small curvature of field even with wide angle of field, and still another object of this invention is to provide a lens with small size.

The objective according to this invention comprises front and back lens groups symmetrically arranged on opposite sides of a stop, the front lens group consisting of a first lens group $L_1$ having a convex surface directed toward the object with meniscus form and a second, cemented positive lens group $L_2$ with a convex surface directed toward the objective backwardly spaced from the first leng lens group; the back lens group consisting of a third lens group $L_3$ and fourth lens group $L_4$ herein the back lens group has symmetrical arrangement and configuration with the front lens group with respect to the stop; and holding the following conditions $$0.65\, l > \frac{r_1}{|r_{10}|} > 0.35\, l \qquad \text{I}$$

$$0.06 f > d_5 > 0.01 f \qquad \text{II}$$

$$\frac{d_1}{d_9} > 0.04\, f \qquad \text{III}$$

$$0.08\, f > \frac{d_3 + d_4}{d_6 + d_7} > 0.02\, f \qquad \text{IV}$$

wherein
- $f$    a composite focal length of the whole lens system
- $l$    an axial length of the whole lens system
- $r_1$    the radius of the curvature of the object side sarface of the first lens group $L_1$
- $r_{10}$    the radius of the curvature of the image field side surface of the fourth lens group $L_4$
- $d_1$    the sum of the glass thickness of the first lens group $L_1$
- $d_3 + d_4$    the axial glass thickness of the second lens group $L_2$
- $d_5$    the air gap between the image field side surface of the second lens group and the object side surface of the third lens group.
- $d_6 + d_7$    the axial glass thickness of the third lens group $L_3$
- $d_9$    the sum of the glass thickness of the fourth lens group $L_4$ The meaning of the above various conditions will now be explained.

Regarding the variation of the distrotion aberration due to change of the magnification, it is thought to mainly stem that the oblique principal ray will not pass through the center of the stop at individual magnifications. namely as the angle of field is correspondingly changed, the height of the oblique principal ray passing through a lens close to the stop varies with various magnifications, the variation being most pronounced at the stop side surface of the lens closest to the stop.

In case that the air gap between stop and lens is large as in the structures of FIGS. 1a and 1b, the height of the ray at the position of the stop is subject to extreme variations. Therefore, even a slight change of magnification is likely to bring about a situation where the oblique ray cannot pass through the center of the stop, which gives rise distortion in combination with other causes.

Then, the conditions I and II are provided for stabilizing the height of the oblique principal ray irrespective of changes of the magnification.

The condition I is provided for setting the center of curvature of the outermost surfaces $r_1$ and $r_{10}$ to the vicinity of the stop position.

With this condition, even if the incidence angle and exit angle to the outermost surfaces $r_1$ and $r_{10}$ change with change of the magnification, the change of the angle with respect to the surface normal may be prevented as much as possible. Thus, the ray may be directed toward (or from) the center of the stop, so that the generation of high order distortiom can be suppressed.

However, if at least one of the values of $r_1$ and $r_{10}$ is reduced beyond the lower limit of the condition I, the variation of the distortion with change of the magnification is increased at wide angle of field. If at least one of them is increased beyond the upper limit, not only the variation of the distortion but also the petzval sum is increased, so that the curvature of image field is increased.

The condition II is provided for having small air gap between the second lens group $L_2$ or third lens group $L_3$ and the stop so as to ensure the distortion compensation effect.

As has been mentioned earlier, the action at the stop side surface $r_5$ of the second lens $L_2$ is enlarged due to the length of the air gap following the stop, thus causing great variation of the height of the ray at the stop position.

According to the invention, this is prevented by providing the condition II. From the symmetrical relation, this also applies to the air gap between the stop and the stop side surface of the third lens group $L_3$.

Then, the distortion can be suppressed to an extremely small value. However, if the $d_5$ is increased beyond the limit of the condition II, the variation of the distortion is extremely increased, and also the outer diameter of the lens system is also increased.

If it is reduced to be narrower than the lower limit, it becomes difficult to balance the meridional and sagittal image surface.

Next, in order to obtain sufficient compensation for the curvature of image field, the petzval sum of the whole system must be reduced.

To this end, it is known that the lens power may be increased. If this is directly applied, however, the spherical aberration and other aberrations are increased.

According to the invention, the lens power is increased only to an extent allowable from the standpoint of compensation of the aberrations, and instead the conditions III and IV are provided.

The conditions III and IV are provided to meet this end. More particularly, in order to make the air gap tending to increase the petzval sum as small as possible, the axial thickness of the first $L_1$ to fourth lens groups $L_4$ is increased to replace the fourth air space with glass.

At this time, if the thickness $d_1$ and $d_9$ of the first lens group $L_1$ and the fourth lens group $L_4$ are reduced to be below the lower limit of the conditions III and IV, the petzval sum will be increased, so that the sufficient compensation for the curvature of field becomes difficult. On the other hand, if the thickness of the second and third lenses are increased beyond the upper limit of the condition IV, the astigmatism is increased, so that it becomes difficult to balance the meridonal and sagittal curvatures of the final surface.

With these conditions the petzval sum can be successfully reduced so that the curvature of image field is reduced particularly sagittal image surface.

The conditions III and IV are also useful for reducing the size of the whole lens system. With conditions III and IV, the proportion of glass portion occupied with respect to the length of the whole lens system can be increased. Thus, the long optical path in the prior art objective having large proportion of air portion can be confined to be within a comparatively small gap near the stop, so that the distance between outermost surfaces, i.e., the length of the whole system can be reduced.

In other words, the conditions permit satisfactory compensation of the curvature of field while reducing the size of the whole system.

$r_1 r_2 \ldots \ldots r_{14}$: Radii of the curvatures of the respective lens surfaces.
$d_1 d_2 \ldots \ldots d_{13}$: Axial distances of the respective component lenses and air gaps.
$n_1 n_2 \ldots \ldots n_8$: the refractive indeces of the respective component lenses with respect to $d$ line
$v_1 v_2 \ldots \ldots v_3$: the Abbe numbers of the respective component lenses.

First embodiment

$f=1.0$, F 10, Field angle 70°, $l=0.3899\ f$

| | | | |
|---|---|---|---|
| $r_1 = 0.2036$ | $d_1 = 0.0986$ | $n_1 = 1.65844$ | $v_1 = 50.9$ |
| $r_2 = 0.1684$ | $d_2 = 0.0258$ | | |
| $r_3 = 0.3214$ | $d_3 = 0.0138$ | $n_2 = 1.53172$ | $v_2 = 48.9$ |
| $r_4 = 0.1162$ | $d_4 = 0.0390$ | $n_3 = 1.49388$ | $v_3 = 66.1$ |
| $r_5 = 0.7762$ | $d_5 = 0.0355$ | | |
| $r_6 = 0.7762$ | $d_6 = 0.0390$ | $n_4 = 1.49388$ | $v_4 = 66.1$ |
| $r_7 = -0.1162$ | $d_7 = 0.0138$ | $n_5 = 1.53172$ | $v_5 = 48.9$ |
| $r_8 = -0.3214$ | $d_8 = 0.0258$ | | |
| $r_9 = -0.1684$ | $d_9 = 0.0986$ | $n_6 = 1.65844$ | $v_6 = 50.9$ |
| $r_{10} = -0.2036$ | | | |

Second embodiment

$f = 1.0$ F 10, Field angle 70° $l=0.4493\ f$

| | | | |
|---|---|---|---|
| $r_1 = 0.2259$ | $d_1 = 0.1311$ | $n_1 = 1.62299$ | $v_1 = 58.2$ |
| $r_2 = 0.1775$ | $d_2 = 0.0213$ | | |
| $r_3 = 0.3303$ | $d_3 = 0.0093$ | $n_2 = 1.54814$ | $v_2 = 45.8$ |
| $r_4 = 0.1349$ | $d_4 = 0.0442$ | $n_3 = 1.51633$ | $v_3 = 64.1$ |
| $r_5 = 0.8520$ | $d_5 = 0.0375$ | | |
| $r_6 = -0.8520$ | $d_6 = 0.0442$ | $n_4 = 1.51633$ | $v_4 = 64.1$ |
| $r_7 = -0.1349$ | $d_7 = 0.0093$ | $n_5 = 1.54814$ | $v_5 = 45.8$ |
| $r_8 = -0.3303$ | $d_8 = 0.0213$ | | |
| $r_9 = -0.1775$ | $d_9 = 0.1311$ | $n_6 = 1.62299$ | $v_6 = 58.2$ |
| $r_{10} = -0.2259$ | | | |

$l$: the length of the whole lens system.

The aberrations of the above first and second embodiments are shown in FIG. 4 to FIG. 7.

Referring to these figures, all sorts of aberrations are corrected at optimum balance over the field angle of 70° and also, the length of the whole lens system is remarkably reduced, that is, shorter than 0.45 $f$.

These results proves that the means for aberration correction according to this invention are effective and appropriate. And further, it is found that the variation of disfortion due to the change of magnification is small and the field curvatures are adequately corrected.

In the above embodiments, the first and fourth lens groups respectively consist of a single lens and the second and third lens groups respectively consist of cemented lenses.

However, a man can form other lens groups than the above within the scope of this invention.

For example, the first and fourth lens group may be cemented lenses or two lenses spaced from each other with air gap.

Third Embodiment

Figure 1A:
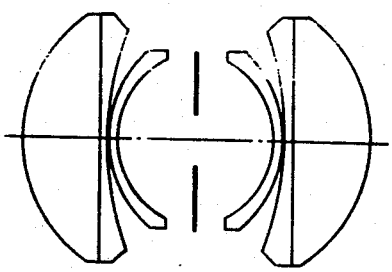
FIG. 1a, 1b and 1c show symmetrical objectives in prior art.
Figure 1B:
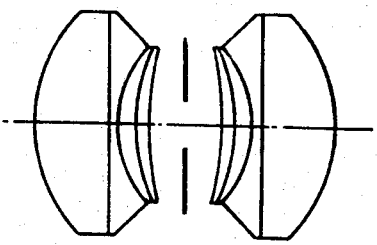
Figure 1C:
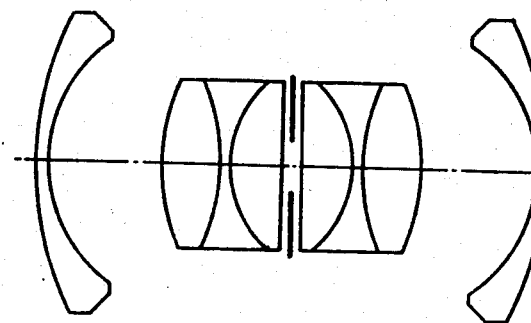
Figure 2:
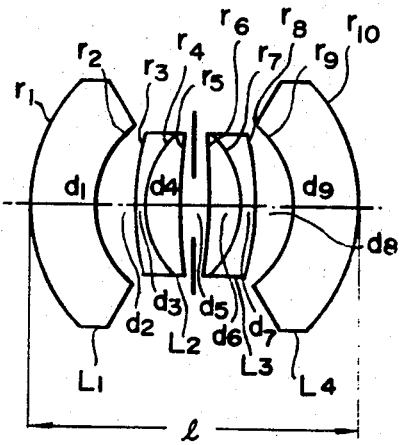
FIG. 2 shows a structure of a first embodiment of the invention.
Figure 3:
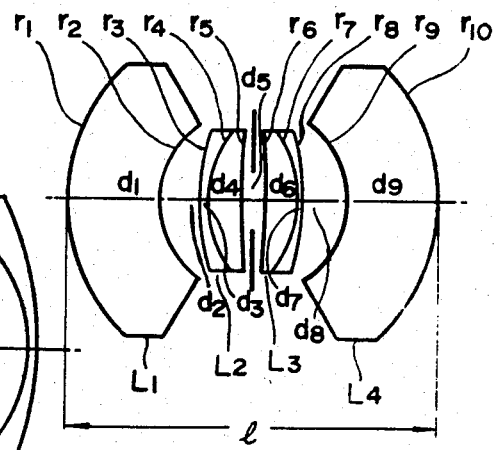
FIG. 3 shows a structure of a second embodiment of the invention.
Figure 4:
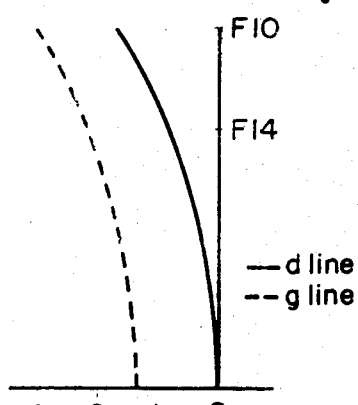
FIG. 4 is an aberration diagram at unity magnification of the first embodiment of FIG. 2.
Figure 4:
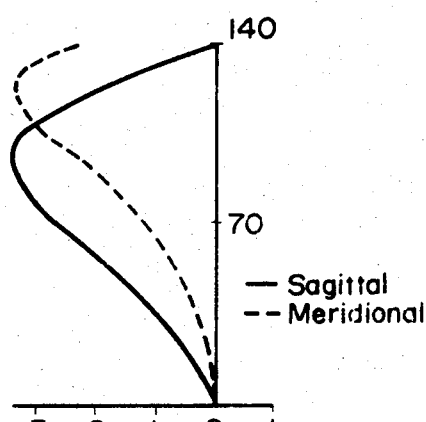
Figure 5:
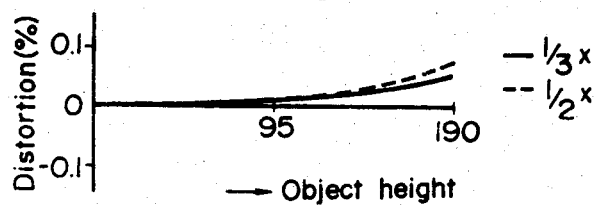
FIG. 5 is an aberration diagram showing the variations of distortion of the first embodiment due to changes of the magnification.
Figure 6:
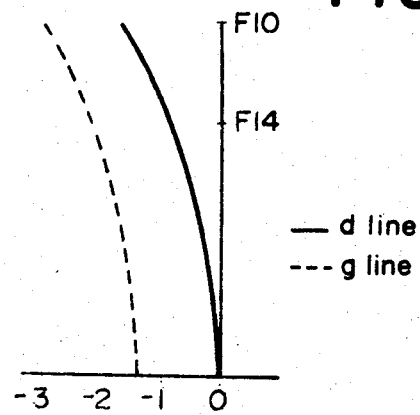
FIG. 6 is an aberration diagram at unity magnification of the second embodiment of FIG. 3.
Figure 6:
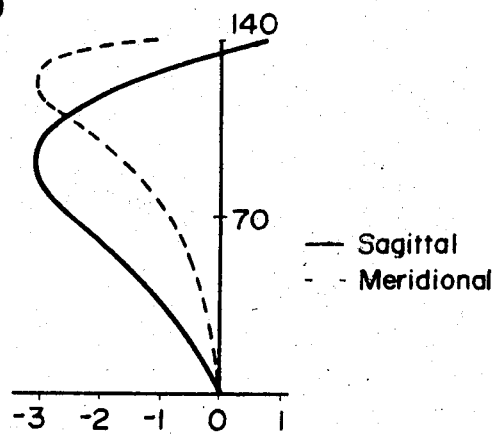
Figure 7:
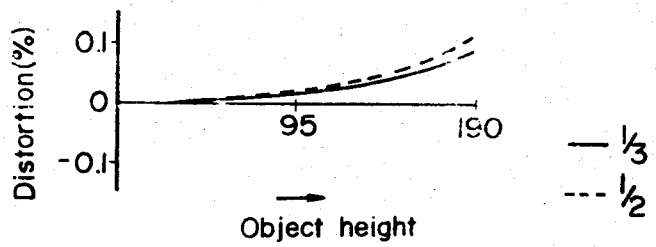
FIG. 7 is an aberration diagram showing the variation of distortion of the second embodiment due to changes of the magnification.
Figure 8:
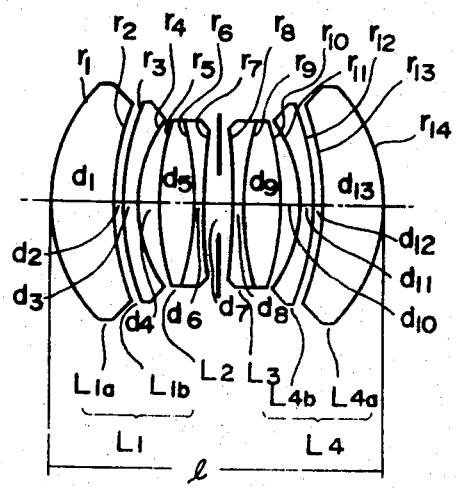
FIG. 8 shows a structure of a third embodiment of the invention.

As shown in FIG. 8. this embodiment is the one in which the first lens group $L_1$ consists of a positive memiscus lens $L_{1a}$ having a convex surface directed directed towads the object and a negative meniscus lens $L_{1b}$ having a convex sarface and arranged behind the lens $L_{1a}$ with air gap: and the fourth lens group $L_4$ consisting of a lens $L_{4b}$ and a lens $L_{4a}$ which have respectively symmetrical configurations and arrangement with the lenses $L_{1b}$ and $L_{1a}$.

This embodiment has advanteges that curvatares of field and a cromatic aberration are more effectively corrected. These advantages are obtained by the following conditions $$0.65\, l > \frac{r_1}{|r_{14}|} > 0.35\, l \qquad \text{I'}$$

$$0.06\, f > d_7 > 0.01\, f \qquad \text{II'}$$

$$\frac{d_1 + d_3}{d_{11} + d_{13}} > 0.04\, f \qquad \text{III'}$$

$$0.08\, f > \frac{d_5 + d_6}{d_8 + d_9} > 0.02\, f \qquad \text{IV}$$

$$0.7\, f > \frac{|r_6|}{r_9} > 0.2\, f \qquad \text{V}$$

$$0.30 > \frac{n_4 - n_3}{n_5 - n_6} > 0.02 \qquad \text{VI}$$

$$25 > \frac{v_1 - v_2}{v_8 - v_7} > 5 \qquad \text{VII}$$

$$0.03\, f > \frac{d_2}{d_{12}} > 0.003\, f \qquad \text{VIII}$$

$$\frac{r_2}{|r_{13}|} > \frac{r_3}{|r_{12}|} > \frac{r_4 + d_3}{|r_{11}| + d_{11}} \qquad \text{IX}$$

wherein $r_1$ and $r_{14}$ are respectively the radii of carvature of the objectside surface of the first lens group $L_1$ and the image side of the fourth lens group;

$d_7$ is the air gap between the image field side surfaces of the second lens group $L_2$ and the third lens group $L_3$:

$d_1+d_3$ and $d_{11}+d_{13}$ represent respectively the sum of the axial glass thickness of the first lens group $L_1$ and the sum of the axial glass thickness of the fourth lens group $L_4$;

$d_5+d_6$ and $d_8+d_7$ represent respectively the axial thicknesses of the second lens group $L_2$ and the third lens group $L_3$;

$r_6$ and $r_9$ are radii of the curvatures of the cemented interfaces in the second and the third lens sreups $L_2\, L_3$;

$n_3$ and $n_4$ are the refractive indeces of the respective object side and image field side component lens on opposite sides of the cemented face in the second lens group $L_2$;

$n_5$ and $n_6$ are the refractive indeces of the respective object field side and image field side component lenses on opposite sides of the cementeinterface in the third lens group $L_3$:

$v_1$ and $v_2$ are the Abbe numbers of component lenses consisting the first lens group $L_1$; $v_7$ and $v_8$ are the Abbe numbers of component lenses consisting the fourth lens group $L_4$;

$d_2$ and $d_{12}$ are respectively represent the air gap between the component lenses consisting respectively the first and the fourth lens groups, $L_1$, $L_4$ $r_2$ and $r_{13}$ are respectively the radii of carvature of the image field side surface of the the front component lens consisting the first lens group $L_1$ and the object side surface of the rear component lens consisting the fourth lens group $L_4$; $r_3$ and $r_4$ are the radii of the curvatures of the respective object side and image field side of the rear component lens consisting the first lens group $L_1$; $r_{11}$ and $r_{12}$ are the radii of curvatures of the respective object side and image field side surfaces of the rear component lens consisting the fourth lens group $L_4$;

$d_3$ is the oxial thickness of the rear component lens consisting the first lens group $L_1$; and $d_{11}$ is the axial thickness of the front component lens consisting the fourth lens group $L_4$.

The meaning of the above conditions will be now explained. The conditions (I') to (IV') are aquivalent to the condition (I) to (IV) of which meanings are mentioned already and the explanation of these meanings are omitted.

Since the lens system of the third embodiment comprises more component lenses than the first and the second embodiments, the suffixes of $r$, $d$, $n$ and $v$ are different from these in the first and second embodiments.

The petzval sum can be successfully reduced, so that the curvature of field, particularly sagittal image surface is corrected by the codnitions of (III) and (IV) as above. However, these conditions can not meet a higher and more strict requirement.

The third embodiment is the one able to meet a higher and more strict requirement. The meridional image surface at hiher angle of image field tends to be bended toward the objective by only the conditions (III) and (IV)

In order to sufficiently compensate for the meridional image surface, therefore, it is necessary to cause overcorrection at higher angle of field.

The conditions V and VI are provided to this end.

For the front lens group, the cemented face $r_6$ concave directed towards the object and the refractive index difference $n_4-n_3$ at this cemented face are so adapted to cause sudden overside bending of the meridional image surface of high angle of field.

From the symmetrical relation, this also applies to $r_9$ and $n_5$–$n_6$, so that it is possible to very satisfactorily compensate for the curvature of final image surface.

At this time, if $|r_6|$ and $r_9$ are increased beyond the upper litmit of the condition V, the compensation effect toward the over-correction of the higher order meridional image surface is extremely reduced in relation to the condition V. On the other hand, if it is increased beyond the upper limit, the petzval sum is suddenly increased, resulting to increase the curvature of image surface, particularly sagittal image surface.

The ray incident on the lens system is intensevely refracted at the convex end surface facing the object, and as it passes through the thick glass it undergoes very notable chromatic aberration. From the symmetrical relation, this also results at the image side end lens of the back lens group.

In order to obtain an objective of high performance, therefore, this doubled chromatic aberration must be sufficiently compensated for.

To this end, it is thought to be most effective to provide means for the compensation within the most thick lens.

According to this embodiment the chromatic aberration is compensated by replacing each of the outermost lens in the four-lens group symmetrical objective of the first and second embodiment with two lenses, namely positive and negative lenses $L_{1a}$ and $L_{1b}$ or $L_{4b}$ and $L_{4a}$.

Thus, the first and second lenses $L_{1a}$ and $L_{1b}$ and the fifth and sixth lenses $L_{4b}$ and $L_{4a}$ constitute sufficient achromatic lenses, so that effective means for compensating for axial and lateral chromatic aberration can be provided.

At this time, if the Abbe number differences $V_1$–$V_2$ and $V_8$–$V_7$ is increased beyond the upper limit of the condition VII, overcompensation will result, and if they are reduced to be lower than the lower limit insufficient compensation will result.

As has been mentioned earlier, according to the invention the cemented faces $r_6$ and $r_9$ concave directed toward the object (for the front lens group) and towards the image (for the back lens group) and refractive index differences $n_4$–$n_3$ and $n_5$–$n_6$ are provided by the conditions V and VI for compensation of the meridional image surface, but this type of cemented face and reflective index difference will bring about positive coma flare.

Therefore, in order to obtain sufficient image it is necessary to cancel this coma flare by producing a negative coma flare. The conditions VIII and IX are provided to this end. Under these conditions, a negative coma flare may be produced without adversely affecting other factors, for instance compensation of curvature of field and chromatic aberration and reduction of the size of the lens system.

Since the oblique rays pass through the portions far from the optical axis with respect to the first and sixth lenses $L_1$ and $L_{4a}$, utilizing the refractive action of the lenses $L_{1a}$ and $L_{4a}$ to the utmost by providing air on both sides of each of these lenses it is possible to increase nagative coma flare of higher order.

At this time, if $d_2$ and $d_{12}$ is increased beyond the upper limit, inconvenience will be encountered in the compensation of the curvature of field and coma flare and reduction of the size of the lens system, while if they are reduced to be below the lower limit the, intended compensation effects cannot be obtained.

The condition IX also ensures for making the ray passing through the first lens $L_{1a}$ enter the subsequent lens $L_{1b}$ without any difficulty encountered in view of aberration. Because of the symmetrical type this condition also is applied to $|r_{12}|$ for the back lens group.

At this time, if $r_3$ and $|r_{12}|$ is increased beyond the upper limit of the condition, positive higher order coma flare will be produced.

Its lower limit is provided to ensure effective chromatic aberration compensation in relation to the aforementioned condition VII with the second lens $L_{1b}$ and fifth lens $L_{4b}$.

The third embodiment will now be given below referring to FIG. 8.

$f = 1.0$, field angle 70°, $l = 0.3915 f$

| | | | |
|---|---|---|---|
| $r_1 = 0.2024$ | | | |
| | $d_1 = 0.0742$ | $n_1 = 1.65844$ | $v_1 = 50.9$ |
| $r_2 = 0.3429$ | | | |
| | $d_2 = 0.0097$ | | |
| $r_3 = 0.3252$ | | | |
| | $d_3 = 0.0189$ | $n_2 = 1.63636$ | $v_2 = 35.4$ |
| $r_4 = 0.1579$ | | | |
| | $d_4 = 0.0238$ | | |
| $r_5 = 0.3547$ | | | |
| | $d_5 = 0.0388$ | $n_3 = 1.51633$ | $v_3 = 64.1$ |
| $r_6 = -0.4201$ | | | |
| | $d_6 = 0.0140$ | $n_4 = 1.56873$ | $v_4 = 63.1$ |
| $r_7 = 1.0100$ | | | |
| | $d_7 = 0.0328$ | | |
| $r_8 = -1.0100$ | | | |
| | $d_8 = 0.0140$ | $n_5 = 1.56873$ | $v_5 = 63.1$ |
| $r_9 = 0.4201$ | | | |
| | $d_9 = 0.0388$ | $n_6 = 1.51633$ | $v_6 = 64.1$ |
| $r_{10} = -0.3547$ | | | |
| | $d_{10} = 0.0238$ | | |
| $r_{11} = -0.1579$ | | | |
| | $d_{11} = 0.0189$ | $n_7 = 1.63636$ | $v_7 = 35.4$ |
| $r_{12} = -0.3252$ | | | |
| | $d_{12} = 0.0097$ | | |
| $r_{13} = -0.3429$ | | | |
| | $d_{13} = 0.0742$ | $n_8 = 1.65844$ | $v_8 = 50.9$ |
| $r_{14} = -0.2024$ | | | |

Figure 9:
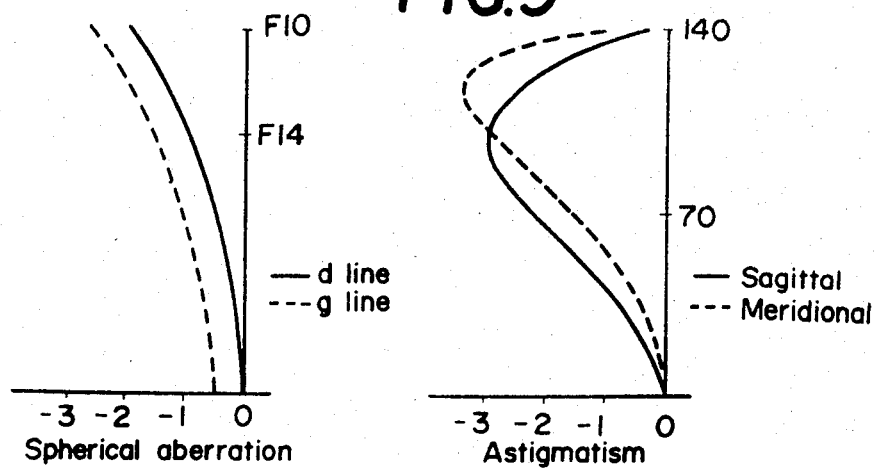
FIG. 9 is an aberration diagram at unity magnification of the third embodiment of FIG. 8.
Figure 9:
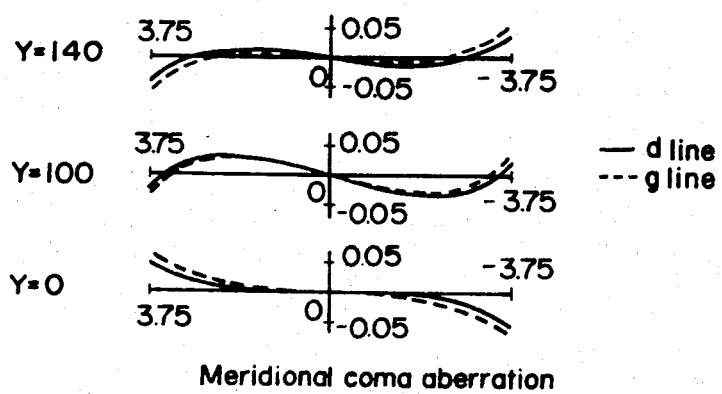
Figure 10:
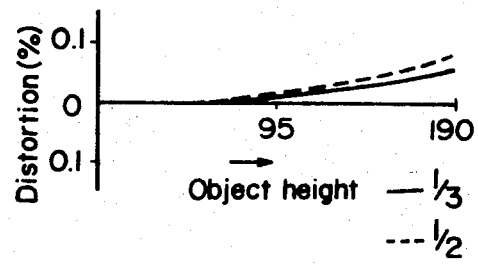
FIG. 10 is an aberration diagram showing variations of distortion of the third embodiment due to changes of the magnification.

FIGS. 9 and 10 show aberration curves of this embodiment. As shown in FIG. 9, the sagittal image surface and astigmatism are very slight. Also, the chromatic aberration and coma are sufficiently compensated for.

Further, variation of aberration due to change of the magnification from unity magnification down to one-third thereof is very slight as shown in FIG. 10.

Besides, the ratio of the length of the whole system to the composite focal length is $0.39f$, which indicates that the afore-mentioned various compensating means are effective.

In some cases, the first and second lenses $L_{1a}$ and $L_{1b}$ and/or the fifth and sixth lenses $L_{4b}$ and $L_{4a}$ may be cemented together. Also, if necessary, the individual single lenses may be replaced with cemented lenses.

By so doing, the utility of the prevent invention will not be changed.

As has been described in the foregoing, according to the invention it is possible to provide a symmetrical objective in which the variation of distortion due to change of the magnification from unity magnification down to one-third thereof is small, the curvature of field and astigmatism are very samll even with wide angle of field with field angle reaching 70° and further axial and lateral chromatic aberration as well as coma flare are sufficiently compensated, and which has a small size.

What is claimed is:

1. A symmetrical objective comprising front and back lens groups symmetrically arranged on opposite sides of a stop, the front lens group consisting of a first lens group having a front surface convex toward an object with meniscus form and a second cemented positive lens group having a front surface convex toward the object and rearwardly spaced from the first lens group, the back lens group consisting of a third lens group and a fourth lens group, the third lens group being between the stop and the fourth lens group, said back lens group having a symmetrical arrangement and configurations with the front lens group with respect to the stop; said first lens group consisting of a first lens element, said second lens group consisting of a second lens element and a third lens element rearwardly cemented to the second lens element, said third lens group consisting of a fourth lens element and a fifth lens element rearwardly cemented to the fourth lens element, said fourth lens group consisting of a sixth lens element, said objective having an equivalent focal length of 1.0 decimeter when constructed according to the following parameters:

| Element No. | N | V | Radius Decimeter | Axial Thickness or Air Space Decimeter |
|---|---|---|---|---|
| 1 | 1.65844 | 50.9 | $r_1 = 0.2036$ | $d_1 = 0.0986$ |
|   |         |      | $r_2 = 0.1684$ | $d_2 = 0.0258$ |
| 2 | 1.53172 | 48.9 | $r_3 = 0.3214$ | $d_3 = 0.0138$ |
| 3 | 1.49388 | 66.1 | $r_4 = 0.1162$ | $d_4 = 0.0390$ |
|   |         |      | $r_5 = 0.7762$ | $d_5 = 0.0355$ |
| 4 | 1.49388 | 66.1 | $r_6 = -0.7762$ | $d_6 = 0.0390$ |
| 5 | 1.53172 | 48.9 | $r_7 = -0.1162$ | $d_7 = 0.0138$ |
|   |         |      | $r_8 = -0.3214$ | $d_8 = 0.0258$ |
| 6 | 1.65844 | 50.9 | $r_9 = -0.1684$ | $d_9 = 0.0986$ |
|   |         |      | $r_{10} = -0.2036$ |   | wherein N and V are respectively refractive indices and Abbe numbers, Radii are numbered from $r_1$ to $r_{10}$, the axial glass thickness and axial air space are successively numbered $d_1$ to $d_9$.

2. A symmetrical objective comprising front and back lens group symmetrically arranged on opposite sides of a stop, the front lens group consisting of a first lens group having a front surface convex toward an object with meniscus form and a second cemented positive lens group, the back lens group consisting of a third lens group and a fourth lens group, the third lens group being between the stop and the fourth lens group, said back lens group having a symmetrical arrangement and configurations with the front lens group with respect to the stop; said first lens group consisting of a first lens element, said second lens group consisting of a second lens element, and a third lens element rearwardly cemented to the second lens element, said third lens group consisting of a fourth lens element and fifth lens element rearwardly cemented to the fourth lens element, said fourth lens group consisting of a sixth lens element, said objective having an equivalent focal length of 1.0 decimeter when constructed according to the following parameters:

| Element No. | N | V | Radius Decimeter | Axial Thickness or Air Space Decimeter |
|---|---|---|---|---|
| 1 | 1.62299 | 58.2 | $r_1 = 0.2259$ | $d_1 = 0.1311$ |
|   |         |      | $r_2 = 0.1775$ | $d_2 = 0.0213$ |
| 2 | 1.54814 | 45.8 | $r_3 = 0.3303$ | $d_3 = 0.0093$ |
| 3 | 1.51633 | 64.1 | $r_4 = 0.1349$ | $d_4 = 0.0442$ |
|   |         |      | $r_5 = 0.8520$ | $d_5 = 0.0375$ |
| 4 | 1.51633 | 64.1 | $r_6 = -0.8520$ | $d_6 = 0.0442$ |
| 5 | 1.54814 | 45.8 | $r_7 = -0.1349$ | $d_7 = 0.0093$ |
|   |         |      | $r_8 = -0.3303$ | $d_8 = 0.0213$ |
| 6 | 1.62299 | 58.2 | $r_9 = -0.1775$ | $d_9 = 0.1311$ |
|   |         |      | $r_{10} = -0.2259$ |   | wherein N and V are respectively refractive indices and Abbe numbers, Radii are numbered from $r_1$ to $r_{10}$, the axial glass thickness and axial air space are successively numbered from $d_1$ to $d_9$.

3. A symmetrical objective comprising front and back lens group symmetrically arranged on opposite side of a stop, the front lens group consisting of a first lens group with a front convex toward an object, said first lens group consisting of two separate two lenses with meniscus form as a whole, and a second cemented positive lens group rearwardly spaced from the first lens group and having a front surface convex toward the object, the back lens group comprising a third lens group and a fourth lens group, said back lens group having a symmetrical arrangement and configuration with respect to the stop; said front lens in the first lens group is a first element, the rear lens in the first lens group being a second element, said second lens group consisting of a third element and a fourth element rearwardly cemented to the third element, said third lens group consisting of a fifth element and a sixth element rearwardly cemented to the fifth element, the front lens in the fourth lens group being a seventh element, the rear lens in the fourth lens group being an eighth element, said objective having an equivalent focal length of 1.0 decimeter when constructed according to the following parameters:

| Element No. | N | V | Radius decimeter | Axial thickness and Air Space Decimeter |
|---|---|---|---|---|
| 1 | 1.65844 | 50.9 | $r_1 = 0.2024$ | $d_1 = 0.0742$ |
|   |         |      | $r_2 = 0.3429$ | $d_2 = 0.0097$ |
|   |         |      | $r_3 = 0.3252$ | $d_3 = 0.0189$ |
| 2 | 1.63636 | 35.4 | $r_4 = 0.1579$ | $d_4 = 0.0238$ |
|   |         |      | $r_5 = 0.3547$ | $d_5 = 0.0388$ |
| 3 | 1.51633 | 64.1 | $r_6 = -0.4201$ | $d_6 = 0.0140$ |
| 4 | 1.56873 | 63.1 | $r_7 = 1.0100$ | $d_7 = 0.0328$ |
|   |         |      | $r_8 = -1.0100$ | $d_8 = 0.0140$ |
| 5 | 1.56873 | 63.1 | $r_9 = 0.4201$ | $d_9 = 0.0388$ |
| 6 | 1.51633 | 64.1 | $r_{10} = -0.03547$ | $d_{10} = 0.0238$ |

-continued

| Element No. | N | V | Radius decimeter | Axial thickness and Air Space Decimeter |
|---|---|---|---|---|
| 7 | 1.63636 | 35.4 | $r_{11}=-0.1579$ | $d_{11}=0.0189$ |
|   |         |      | $r_{12}=-0.3252$ | $d_{12}=0.0097$ |
|   |         |      | $r_{13}=-0.3429$ | $d_{13}=0.0742$ |
| 8 | 1.65844 | 50.9 | $r_{14}=-0.2024$ |   | wherein N and V are respectively refractive indices and Abbe numbers, Radii are numbered from $V_1$ to $V_{14}$, the axial glass thickness and axial air space are successively numbered from $d_1$ to $d_9$.

* * * * *